United States Patent [19]
Wright

[11] 3,980,934

[45] Sept. 14, 1976

[54] CONTROL CIRCUITS FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,526

[30] Foreign Application Priority Data

June 30, 1973 United Kingdom............... 31305/73
June 30, 1973 United Kingdom............... 31302/73
June 30, 1973 United Kingdom............... 31304/73

[52] U.S. Cl.............................. 318/139; 318/258; 318/269; 318/341; 318/345; 318/284
[51] Int. Cl.² ....................................... H02P 1/22
[58] Field of Search .......... 318/139, 258, 269, 341, 318/345, 373, 257, 284

[56] References Cited

UNITED STATES PATENTS

| | | | |
|---|---|---|---|
| 3,344,328 | 9/1974 | Morris | 318/373 |
| 3,546,548 | 12/1970 | Wouk | 318/139 |
| 3,564,366 | 2/1971 | Worrell | 318/284 X |
| 3,777,237 | 12/1973 | Anderson | 318/345 |
| 3,818,291 | 6/1974 | Miyake | 318/341 |
| 3,841,238 | 10/1974 | Thompson et al. | 318/341 X |

Primary Examiner—Gene Z. Rubinson
Attorney, Agent, or Firm—Holman & Stern

[57] ABSTRACT

A control circuit for an electrically driven vehicle has contactors for determining the direction of operation of the motor, but these contactors cannot be operated until the current flowing through the motor is below a predetermined level.

5 Claims, 6 Drawing Figures

CONTROL CIRCUITS FOR ELECTRICALLY DRIVEN VEHICLES

This invention relates to control circuits for electrically driven vehicles.

A circuit according to the invention comprises in combination a traction motor for driving the vehicle, a regulator controlling the armature current of the traction motor, contactors associated with the motor to determine the direction of operation of the motor, switch means controlling the contactors, and current sensitive means operable to prevent operation of the contactors until the current flowing through the motor is below a predetermined level.

Figure 1:
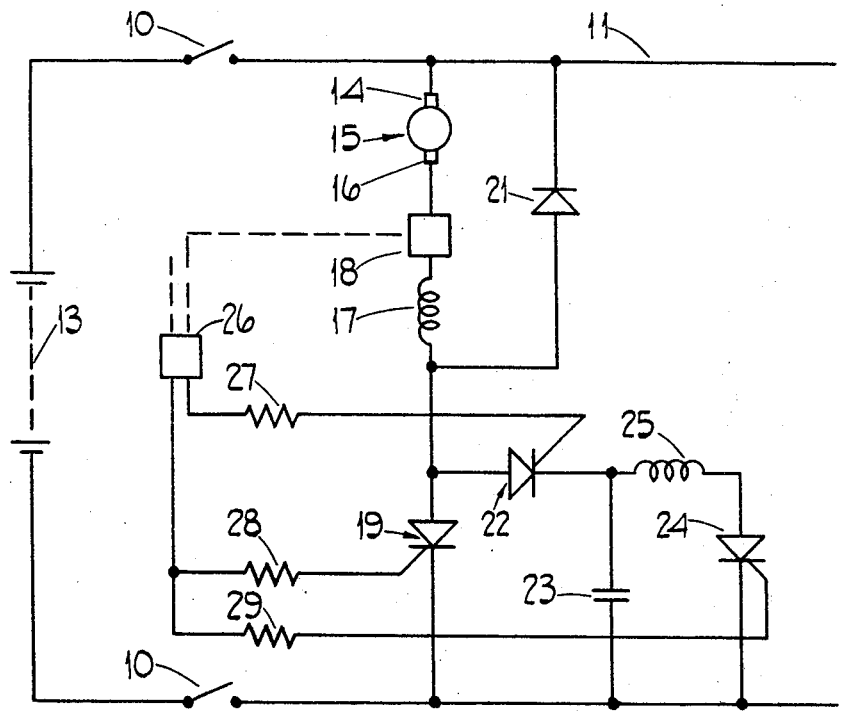
Figure 2:
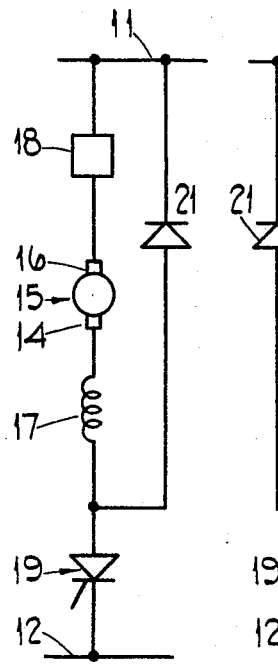
Figure 3:
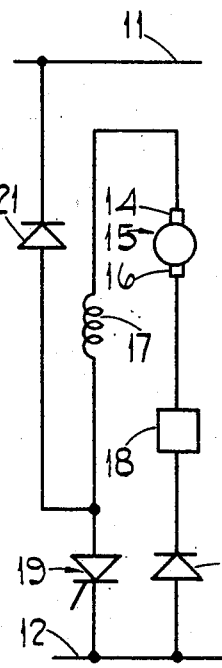
Figure 4:
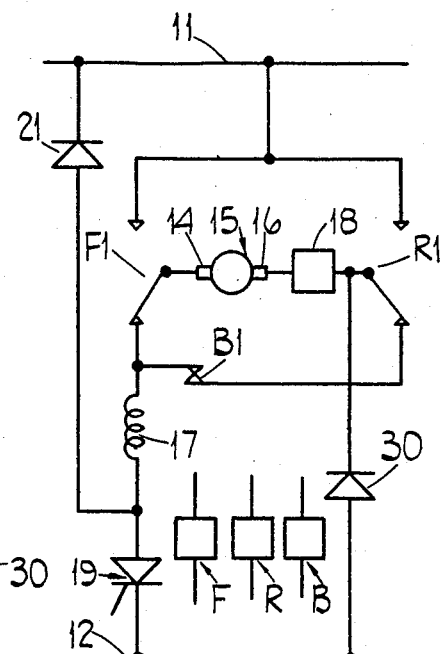
Figure 5:
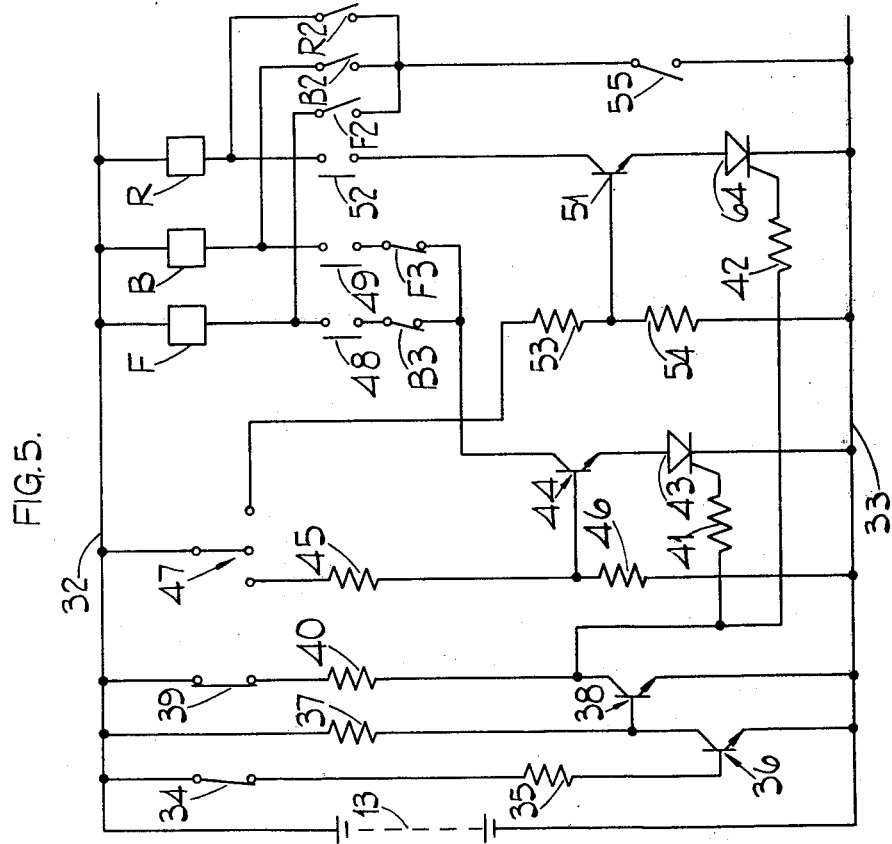

An example of the invention is illustrated in the accompanying drawings, in which FIGS. 1 to 3 are circuit diagrams of a control circuit for an electrically driven vehicle showing three alternative connections of the circuit, FIG. 4 illustrates one arrangement of contactors for producing the connections shown in FIGS. 1 to 3, FIG. 5 is a circuit diagram of a control arrangement for use in FIGS. 1 to 4, and FIG. 6 is a block diagram corresponding to FIG. 5.

Referring first to FIG. 1, there are provided positive and negative supply lines 11, 12 connected through contact 10 to the traction battery 13 of the vehicle. Typically, the battery 13 has a voltage in excess of 200 volts. Connected to the line 11 is one end 14 of the armature of a series wound traction motor 15, the other end 16 of the armature being connected to the line 12 through a series circuit including a current sensing device 18, the field winding 17 of the motor 15 and the anode-cathode path of a thyristor 19. Sensing device 18 is more fully described in U.S. Pat. 3,841,238, issued Oct. 15, 1974. The series combination of armature, device 18 and winding 17 is bridged by a freewheel diode 21, and the junction of the winding 17 and thyristor 19 is connected to the anode of a thyristor 22, the cathode of which is connected to the line 12 through a capacitor 23. The capacitor 23 is bridged by an inductor 25 and the anode-cathode path of a thyristor 24 in series. The thyristors 19 and 24 have their gates connected through resistors 28, 29 respectively to one output terminal of a control unit 26, the unit 26 having a second output terminal which is connected through a resistor 27 to the gate of the thyristor 22. Control unit 26 is more fully described in U.S. Pat. 3,841,238, Oct. 15, 1974.

FIG. 1 shows the circuit connections when the vehicle is being driven in a forward direction. The accelerator pedal of the vehicle operates a potentiometer which produces an output representing the demanded current level in the motor. This output signal is converted to two signals representing an upper current level and a lower current level respectively, and those two signals are sensed by the control unit 26, which also receives a signal from the device 18. When the current flow of the motor reaches the upper level, the thyristor 19 is turned off, and when the current flow falls to the lower level, the thyristor 19 is turned on again. The operation of the circuit to control the thyristor 19 is best explained by commencing at a point in the cycle of operations when the thyristors 19 and 24 are off, and the thyristor 22 is conducting and charging the capacitor 23. When the capacitor 23 is charged, current flow through the thyristor 22 reduces to zero and so the thyristor 22 turns off. Since the thyristor 19 is not conducting, the current flow in the device 18 will be decreasing, and when the current reaches the lower level, the unit 26 produces an output to turn on the thyristor 19 and the thyristor 24. Conduction of the thyristor 24 causes the charge on the capacitor 23 to be reversed, after which the thyristor 24 turns off. The capacitor 23 is now charged with its lower plate positive and its upper plate negative. Conduction of the thyristor 19 causes current to flow in the armature 15 and the winding 17, and the current flowing in the device 18 now increases until it reaches the upper level. When this upper level is reached, the control unit 26 produces an output to turn on the thyristor 22, permitting discharge of the capacitor 23 with the result that the thyristor 19 is turned off. The capacitor 23 now charges again through the thyristor 22 and the cycle is repeated.

In the arrangement being described, it is also possible to use the motor to brake the vehicle electrically, and to use the motor to drive the vehicle in reverse. FIG. 1 does not show the various contactor arrangements which are used for this purpose, but FIGS. 2 and 3 show the circuit connections when these contactors are in the appropriate position. Thus, FIG. 2 shows the arrangement when the vehicle is to be driven in reverse. The circuit connections are the same as in FIG. 1, except that the end 16 of the motor 15 is now connected to the line 11 through the device 18 and the other end 14 is connected to the winding 17. The operation is exactly the same as in FIG. 1, except that the motor is driven in the reverse direction.

FIG. 3 shows the circuit connections when the motor is being used to brake the vehicle electrically. The end 14 of the motor is connected to the winding 17 as in FIG. 2, but the end 16 is now connected to the line 12 through the device 18 and an additional diode 30 in series. When the motor is being used to brake the vehicle, the potentiometer operated by the accelerator pedal is inoperative, but another potentiometer is operated by the brake pedal, and provides a signal to the unit 26 in exactly the same way as the potentiometer operated by the accelerator pedal. Thus, the current in the motor armature will be controlled in the same way as described with reference to FIG. 1. In this case, however, the motor 15 acts as a generator and charges the battery by way of the diodes 21 and 30.

There are various contactor arrangements that can be used to produce the arrangements shown in FIGS. 1 to 3, but one possible arrangement is shown in FIG. 4. The basic controls of the vehicle are the accelerator pedal, which when depressed operates a potentiometer as previously explained, the brake pedal which operates another potentiometer and also provides normal hydraulic braking for the vehicle, and a selector switch which has a central off position but is movable in opposite directions from the off position to select forward or reverse movement of the vehicle. In FIG. 4 three contactor operating devices F, R, B are shown. If the selector switch is in the forward position and the accelerator pedal is depressed, the device F will be energised and will operate a contact F1 which normally occupies the position shown in the drawing but when the device F is energised moves to its alternative position in which it connects the circuit in the manner indicated in FIG. 1. If, on the other hand, the selector switch is moved to its reverse position and the accelerator pedal is depressed, then the device R is energised and a contact R1 is moved from the position shown to its alternative position, at which point the circuit is in the form indicated in FIG. 2.

If the selector switch is in its forward position, but the brake pedal is depressed, then normal hydraulic braking is provided, but in addition the device B is energised to open the contact B1. The contacts F1 and R1 will be in the positions shown, and so it will be seen that the circuit now has the form shown in FIG. 3, so that electrical braking is provided as explained above.

Although the arrangements shown in FIGS. 1 to 4 relate to a series motor, they can also be applied to shunt and compound motors. In this case, the arrangements described will control the armature current.

In addition to the traction battery, the vehicle incorporates a 24 volt battery 31 providing power to positive and negative supply lines 32, 33. A switch 34 and a resistor 35 are connected in series between the line 32 and the base of an n-p-n transistor 36 having its emitter connected to the line 33 and its collector connected through a resistor 37 to the line 32. The collector of the transmitter 36 is also connected to the base of an n-p-n transistor 38, the emitter of which is connected to the line 33 and the collector of which is connected to the line 32 through a resistor 40 and switch 39 in series. The switch at 34 is sensitive to the speed of the vehicle, and is normally closed, but is opened whenever the vehicle speed exceeds a predetermined low value, typically 4 m.p.h. The switch 39 is controlled by the accelerator pedal, and is normally closed but is opened whenever the accelerator pedal is depressed.

The collector of the transistor 38 is further connected through resistor 41, 42 respectively to the gates of a pair of thyristors 43, 64 the cathodes of which are connected to the line 33. The anode of the thyristor 43 is connected to the emitter of an n-p-n transistor 44 the base of which is connected to the junction of a pair of resistors 45, 46. The selector switch previously referred to is shown at 47, and in addition to its off position has a forward position in which it completes a circuit between the lines 32, 33 by way of the resistors 45, 46, and a reverse position in which it completes a circuit between the lines 32, 33 by way of a pair of resistors 53, 54. The junction of the resistors 53, 54 is connected to the base of an n-p-n transistor 51, the emitter of which is connected to the anode of the thyristor 64. Instead of a single switch, two switches can be used, one for forward and reverse and the other for on-off.

The collector of the transistor 44 is connected to the line 32 through two parallel paths, the first containing a contact B3, a switch 48 and the device F previously referred to in FIG. 4, and the second containing a contact F3, a switch 49 and the device B. The contact B3 and F3 are normally closed contacts operated by the devices B and F respectively. The collector of the transistor 51 is connected to the line 32 through a switch 52 and the device R in series. The switches 48 and 52 are operated by the accelerator pedal of the vehicle, and are closed when the accelerator pedal is depressed. The switch 49 is controlled by the brake pedal of the vehicle and is closed when the brake pedal is depressed. Moreover, each of the devices F, B and R operates a self-hold contact, these contacts being shown at F2, B2 and R2 and being connected in circuit with a switch 55 which is sensitive to the current flowing in the motor armature. Whenever the current flowing in the motor armature is above a predetermined level, typically 30 amps, the switch 55 is closed, so that if one of the devices F, B or R is energised, it remains energised until the current flowing in the armature falls below 30 amps. The contacts F3, B3 prevent simultaneous energisation of the devices F, B, so that if both pedals are depressed simultaneously, the circuit remains in the condition immediately before both pedals were depressed.

The thyristors 43 and 64 receive gate current by way of the switch 39, and so can only receive gate current provided that the accelerator pedal of the vehicle is not depressed. Moreover, even if the accelerator pedal is not depressed, so that the switch 39 is closed, then if the vehicle speed is above 4 m.p.h. the switch 34 will be open, so that the transistor 36 will be off, and current will flow through the resistor 37 to hold the transistor 38 on and prevent supply of gate current to the thyristors 43 and 51. However, assuming that the vehicle is at rest and the accelerator pedal is not depressed, then the switches 34 and 39 are both closed and gate current flows in each of the thyristors 43, 64. If the switch 47 is now moved into its forward position, base-emitter current flows in the transistor 44, and if the accelerator pedal is now depressed, the switch 48 closes to energise the device F. Depression of the accelerator pedal also opens the switch 39, but the thyristor 43 continues to conduct. The speed of the vehicle is now controlled by controlling the current flowing in the armature as described with reference to FIGS. 1 to 4, and when the current flowing in the armature is in excess of 30 amps, the switch 55 closes and completes a self-hold circuit to the device F by way of the contact F2.

Assume now that the swich 47 is returned to its off position. The transistor 44 now turns off, so that the thyristor 43 turns off, but the device F is still energised by way of the switch 55. However, when the current flowing in the armature falls below 30 amps, the switch 55 opens and the device F is de-energised. None of the devices F, B, R can now be energised again until both switches 34 and 39 are closed.

If the switch 47 is left in its forward position, but the driver removes his foot from the accelerator pedal and places it on the brake pedal, then the switch 48 opens, but the thyristor 43 remains on because current flows through the resistor 45 and the base-emitter of the transistor 44 to the thyristor 43. Depression of the brake pedal closes the switch 49, but the device B cannot be energised because the switch F3 is open. When the armature current falls below 30 amps, however, then the switch 55 opens and the devide F is de-energised. When the device F is de-energised, the contact F3 closes and the device B is energised, opening the contact B3 and completing a self-hold circuit by way of the contact B2. Thus, whenever the driver moves his foot from the accelerator pedal to the brake pedal, or from the brake pedal to the accelerator pedal, the appropriate contactor devices will be energised and de-energised only when the current flowing in the armature falls to 30 amps.

Consider now the situation when the switch 47 is moved from its forward position to its reverse position. Movement of the switch 47 away from its forward position turns off the transistor 44 and thyristor 43 as previously explained, and whichever device F, B was energised will remain energised until the current flowing in the armature falls to 30 amps. The device R will not be energised until the vehicle speed falls below 4 m.p.h., at which point the switch 34 closes and gate current is supplied to the thyristor 64. The device R is now energised provided the accelerator pedal is released. If the driver presses the accelerator pedal before the vehicle speed falls to 4 m.p.h., then the device R will not be energised even when the vehicle speed falls to 4 m.p.h. because the switch 39 will be open. If there is any possibility of the vehicle speed falling to 4 m.p.h. before the armature current falls to 30 amps, then in order to prevent the device R from being energised at the same time as one of the devices B or F, two further normally closed contacts operated by the devices B and F can be inserted in the collector of the transistor 51. In this case, then the device R is energised only when the vehicle speed has fallen to 4 m.p.h., the accelerator pedal is not depressed, and neither of the devices F or B is energised.

The sequence of operations if the driver moves the switch 47 from the reverse position to the forward position is similar. The device R remains energised until the current flowing in the armature falls to 30 amps. The thyristor 43 cannot conduct until the vehicle speed is below 4 m.p.h. and the accelerator pedal is not depressed. If there is any possibility of the thyristor 43 conducting before the device R is de-energised, then a normally closed contact operable by the device R can be connected in the collector of the transistor 44.

Figure 6:
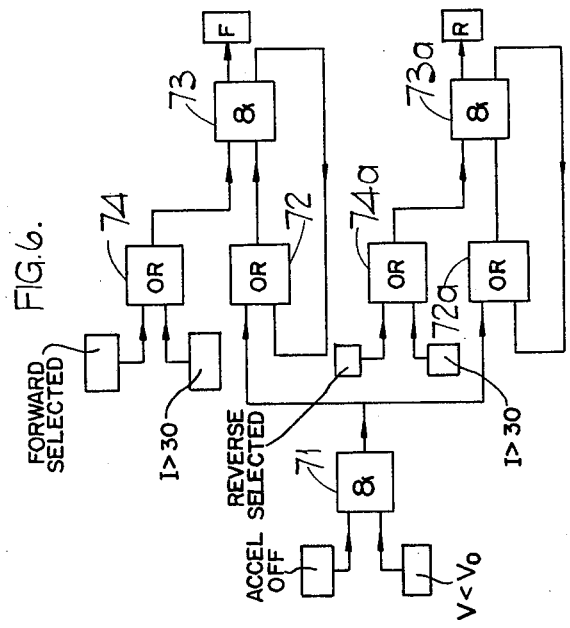

Referring now to FIG. 6, the operation of the circuit to FIG. 5 is shown in block form. An AND gate 71 receives two signals, one when the vehicle speed is below the predetermined value, and the other when the accelerator pedal is not depressed. The gate 71 provides one input to an OR gate 72 which provides an input to an AND gate 73. The gate 73 receives another input from an OR gate 74 which receives two inputs, one when forward is selected by the switch 47, and the other when the current flowing in the motor armature is greater than 30 amps. The AND gate 73 provides an output to operate the forward contactors, and also provides a feedback signal to the gate 72. In FIG. 5, this feedback feature is obtained by virtue of the hold-on properties of the thyristor 43. Thus, when forward is selected on the switch 47, the gate 74 will provide an output whether or not the current is in excess of 30 amps. When the speed is below the predetermined value and the accelerator pedal is not depressed, the gate 71 provides an output, and so the gate 72 now provides an output, enabling the gate 73 to operate the forward contactors. Once the forward contactors are operated, the gate 72 will always produce an output until the gate 73 ceases to produce an output, and so the gate 74 controls the operation. Only when the forward position of the switch 47 is no longer selected, and the current is less than 30 amps, will the gate 73 cease to produce an output.

The gate 71 also provides an input to a channel switch operates the reverse contactors, and includes gates given the same reference numerals but with the suffix *a*. Obviously, the gate 74*a* receives a signal when the reverse position of the switch 47 is selected.

I claim:

1. A control circuit for an electrically driven vehicle comprising in combination a traction motor for driving the vehicle, a regulator controlling the armature current of the traction motor, contactors associated with the motor to determine the direction of operation of the motor, switches means controlling the contactors, and current sensitive means operable to prevent the opening of the contactors when said switch means is actuated for reverse operation of the motor, until the current flowing through the motor is below a predetermined level.

2. A circuit as claimed in claim 1 in which the contactors also have a position which they assume when the switch means is in a position to drive the vehicle forwardly, but the brake pedal of the vehicle is depressed, in which electrical braking is provided, and said current-sensitive means also prevents operation of the contactors to change the motor from its forward motoring condition to its forward braking condition and vice versa until the current flowing through the motor is below a predetermined level.

3. A control circuit for an electrically driven vehicle, comprising in combination a traction motor for driving the vehicle, an accelerator pedal which when depressed determines the armature current of the motor, a brake pedal which when depressed provides electrical braking and also determines the armature current of the motor, and current-sensitive means preventing the motor from changing from its forward motoring condition to its forward braking condition and vice versa unless the current flowing through the motor is below a predetermined value.

4. A circuit as claimed in claim 3 in which means is provided whereby if both pedals are depressed simultaneously, the circuit remains in the condition immediately before both pedals were depressed.

5. A control circuit for an electrically driven vehicle, comprising in combination a traction motor for driving the vehicle, a regulator connected in circuit with the motor for setting the motor armature current in accordance with the setting of the accelerator pedal of the vehicle, contactors associated with the motor determining the direction of operation of the motor, switch means controlling the contactors, current sensitive means operable when said switch means is activated for reverse operation of the motor, the prevent the opening of the contactors until the current flowing through the motor is below a predetermined level, and means operable if the switch means is moved from its forward position to its reverse position for preventing the closing of the contactors to give reverse drive when the forward speed of the vehicle is above a predetermined value.

* * * * *